United States Patent
Gugumus

(10) Patent No.: US 6,512,029 B1
(45) Date of Patent: Jan. 28, 2003

(54) STABILIZED METALLOCENE POLYOLEFINS

(75) Inventor: François Gugumus, Allschwil (CH)

(73) Assignee: Ciba Specialty Chemicals Corporation, Tarrytown, NY (US)

(*) Notice: Subject to any disclaimer, the term of this patent is extended or adjusted under 35 U.S.C. 154(b) by 0 days.

(21) Appl. No.: 09/492,627

(22) Filed: Jan. 27, 2000

(30) Foreign Application Priority Data

Feb. 1, 1999 (EP) .............................. 99810079

(51) Int. Cl.⁷ ................................. C08K 5/34
(52) U.S. Cl. ......................... 524/97; 100/102
(58) Field of Search ............. 524/97, 98, 100, 524/102

(56) References Cited

U.S. PATENT DOCUMENTS

| | | | |
|---|---|---|---|
| 4,863,981 A | 9/1989 | Gugumus | 524/97 |
| 5,719,217 A | 2/1998 | Gugumus | 524/100 |
| 5,955,522 A | 9/1999 | Rotzinger et al. | 524/119 |
| 5,977,218 A | 11/1999 | Bonora | 524/91 |

FOREIGN PATENT DOCUMENTS

| | | | |
|---|---|---|---|
| CA | 2167660 | * | 7/1996 |
| CA | 2175529 | * | 11/1996 |
| EP | 0632092 | | 1/1995 |
| EP | 0723990 | | 7/1996 |
| EP | 0741163 | | 11/1996 |
| EP | 0814127 | | 12/1997 |
| GB | 2267499 | | 12/1993 |

OTHER PUBLICATIONS

Research Disclosure, Jan. 1993, No. 345, Emsworth, GB, Synergistic Stabilizer Compositions.
F. Gugumus et al., Jornada Tecnica, 2/99, Light Stabilization of Metallocene Polyolefins.

* cited by examiner

*Primary Examiner*—Bernard Lipman
(74) *Attorney, Agent, or Firm*—Luther A. R. Hall; David R. Crichton

(57) ABSTRACT

A composition containing
 I) a polyolefin prepared by polymerization over a metallocene catalyst, and
 II) a stabilizer mixture comprising for example

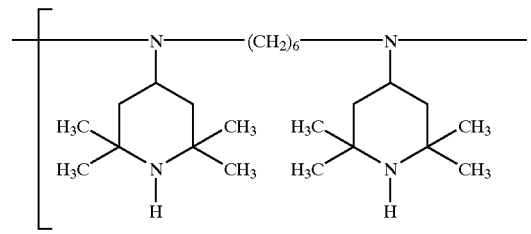

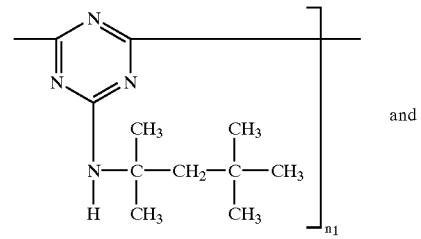

and

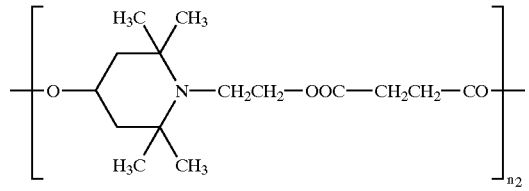

with $n_1$ and $n_2$ being a number from 2 to 25.

12 Claims, No Drawings

STABILIZED METALLOCENE POLYOLEFINS

The present invention relates to a composition containing a polyolefin prepared by polymerization over a metallocene catalyst, and a hindered amine light stabilizer system.

Hindered amine light stabilizer systems are described, for example, in U.S. Pat. Nos. 4,863,981, 5,719,217, EP-A-632,092, EP-A-741,163, EP-A-723,990, GB-A-2,267,499 and Research Disclosure 34,549 (January 1993). EP-A-814,127 discloses embrittlement-resistant polyolefin compositions. U.S. Pat. No. 5,955,522 describes a process for the preparation of olefin polymers by polymerization over a transition metallocene catalyst with the addition of a sterically hindered amine.

In more detail, the present invention relates to a composition containing

I) a polyolefin prepared by polymerization over a metallocene catalyst, and

II) a stabilizer mixture comprising two different components selected from the group of components a), b) and c);

component a) is at least one compound of the formula (I)

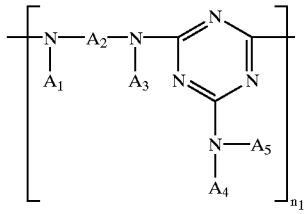

(I)

wherein $A_1$, $A_3$, $A_4$ and $A_5$ independently of one another are hydrogen, $C_1$–$C_{12}$alkyl, $C_5$–$C_{12}$cycloalkyl, $C_1$–$C_4$alkyl-substituted $C_5$–$C_{12}$cycloalkyl, phenyl, —OH— and/or $C_1$–$C_{10}$alkyl-substituted phenyl, $C_7$–$C_9$phenylalkyl, $C_7$–$C_9$phenylalkyl which is substituted on the phenyl radical by —OH and/or $C_1$–$C_{10}$alkyl; or a group of the formula (II),

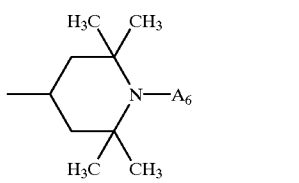

(II)

with $A_6$ being hydrogen, $C_1$–$C_8$alkyl, O$^-$, —OH, —CH$_2$CN, $C_1$–$C_{18}$alkoxy, $C_5$–$C_{12}$cycloalkoxy, $C_3$–$C_6$alkenyl, $C_7$–$C_9$phenylalkyl unsubstituted or substituted on the phenyl by 1, 2 or 3 $C_1$–$C_4$alkyl; or $C_1$–$C_8$acyl, $A_2$ is $C_2$–$C_{18}$alkylene, $C_5$–$C_7$cycloalkylene or $C_1$–$C_4$alkylenedi($C_5$–$C_7$cycloalkylene), or the radicals $A_1$, $A_2$ and $A_3$, together with the nitrogen atoms to which they are attached, form a 5- to 10-membered heterocyclic ring, or $A_4$ and $A_5$, together with the nitrogen atom to which they are attached, form a 5- to 10-membered heterocyclic ring, $n_1$ is a number from 2 to 50, and at least one of the radicals $A_1$, $A_3$, $A_4$ and $A_5$ is a group of the formula (II);

component b) is at least one compound of the formula (III)

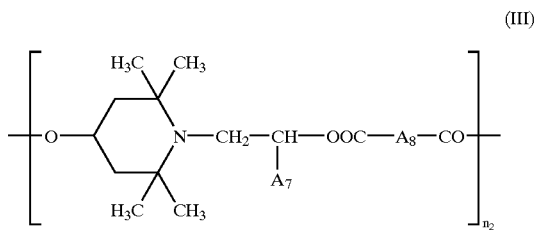

(III)

wherein $A_7$ is hydrogen or $C_1$–$C_4$alkyl, $A_8$ is a direct bond or $C_1$–$C_{10}$alkylene and $n_2$ is a number from 2 to 50; and component c) is at least one compound of the formula (IV)

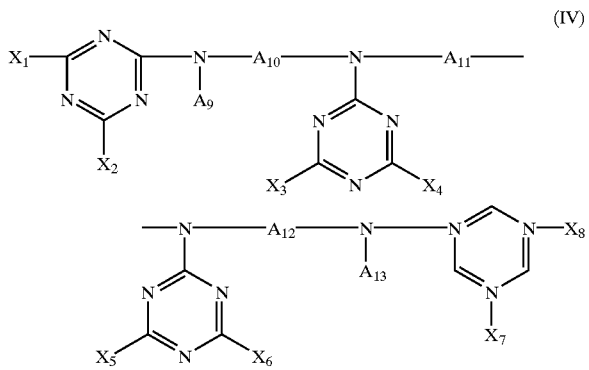

(IV)

wherein $A_9$ and $A_{13}$ independently of one another are hydrogen or $C_1$–$C_{12}$alkyl, $A_{10}$, $A_{11}$ and $A_{12}$ independently of one another are $C_2$–$C_{10}$alkylene, and $X_1$, $X_2$, $X_3$, $X_4$, $X_5$, $X_6$, $X_7$ and $X_8$ independently of one another are a group of the formula (V),

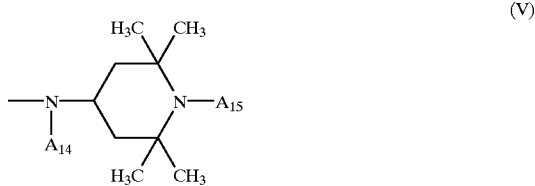

(V)

in which $A_{14}$ is hydrogen, $C_1$–$C_{12}$alkyl, $C_5$–$C_{12}$cycloalkyl, $C_1$–$C_4$alkyl-substituted $C_5$–$C_{12}$cycloalkyl, phenyl, —OH— and/or $C_1$–$C_{10}$alkyl-substituted phenyl, $C_7$–$C_9$phenylalkyl, $C_7$–$C_9$phenylalkyl which is substituted on the phenyl radical by —OH and/or $C_1$–$C_{10}$alkyl; or a group of the formula (II) as defined above, and $A_{15}$ has one of the meanings of $A_6$;

with the proviso that the group —N($A_4$)($A_5$) does not contain a cycloalkyl group when the stabilizer mixture comprises the two components a) and b).

Examples of alkyl having not more than 12 carbon atoms are methyl, ethyl, propyl, isopropyl, n-butyl, sec-butyl, isobutyl, tert-butyl, 2-ethylbutyl, n-pentyl, isopentyl, 1-methylpentyl, 1,3-di-methylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl and dodecyl. A preferred meaning of $A_5$ is $C_1$–$C_8$alkyl, e.g. $C_4$–$C_8$alkyl. A preferred meaning of $A_6$ and $A_{15}$ is $C_1$–$C_4$alkyl, in particular methyl. A preferred meaning of $A_{14}$ is $C_1$–$C_4$alkyl, in particular butyl.

Examples of alkoxy containing not more than 18 carbon atoms are methoxy, ethoxy, propoxy, isopropoxy, butoxy, isobutoxy, pentoxy, isopentoxy, hexoxy, heptoxy, octoxy, decyloxy, dodecyloxy, tetradecyloxy, hexadecyloxy and octadecyloxy. $C_6$–$C_{12}$Alkoxy, in particular heptoxy and octoxy, is one of the preferred meanings of $A_6$ and $A_{15}$.

Examples of $C_5$–$C_{12}$cycloalkyl are cyclopentyl, cyclohexyl, cycloheptyl, cyclooctyl and cyclododecyl. $C_5$–$C_8$cycloalkyl, especially cyclohexyl, is preferred.

$C_1$–$C_4$alkyl-substituted $C_5$–$C_{12}$cycloalkyl is for example methylcyclohexyl or dimethylcyclohexyl.

Examples of $C_5$–$C_{12}$cycloalkoxy are cyclopentoxy, cyclohexoxy, cycloheptoxy, cyclooctoxy, cyclodecyloxy, cyclododecyloxy and methylcyclohexoxy. $C_5$–$C_8$Cycloalkoxy, in particular cyclopentoxy and cyclohexoxy, is preferred.

Examples of $C_3$–$C_6$alkenyl are allyl, 2-methylallyl, butenyl and hexenyl. Alkenyls in which the carbon atom in the 1-position is saturated are preferred, and allyl is particularly preferred.

Examples of $C_1$–$C_8$acyl(aliphatic, cycloaliphatic or aromatic) are formyl, acetyl, propionyl, butyryl, pentanoyl, hexanoyl, heptanoyl, octanoyl and benzoyl. $C_1$–$C_8$Alkanoyl and benzoyl are preferred. Acetyl is especially preferred.

—OH— and/or $C_1$–$C_{10}$alkyl-substituted phenyl is for example methylphenyl, dimethylphenyl, trimethylphenyl, tert-butylphenyl or 3,5-di-tert-butyl-4-hydroxyphenyl.

Examples of $C_7$–$C_9$phenylalkyl are benzyl and phenylethyl.

$C_7$–$C_9$phenylalkyl which is substituted on the phenyl radical by —OH and/or by alkyl having up to 10 carbon atoms is, for example, methylbenzyl, dimethylbenzyl, trimethylbenzyl, tert-butylbenzyl or 3,5-di-tert-butyl-4-hydroxybenzyl.

Examples of alkylene containing not more than 18 carbon atoms are ethylene, propylene, trimethylene, tetramethylene, pentamethylene, hexamethylene, octamethylene, decamethylene, dodecamethylene and octadecamethylene. $A_2$ is for example $C_2$–$C_8$alkylene or $C_4$–$C_8$alkylene, in particular $C_2$–$C_6$alkylene, preferably hexamethylene. $A_8$ is preferably ethylene and the radicals $A_{10}$, $A_{11}$ and $A_{12}$ independently of one another are in particular $C_2$–$C_4$alkylene.

An example of $C_5$–$C_7$cycloalkylene is cyclohexylene.

Examples of $C_1$–$C_4$alkylenedi($C_5$–$C_7$cycloalkylene) are
cyclohexylene-methylene-cyclohexylene and
cyclohexylene-isopropylidene-cyclohexylene.

Where the radicals $A_1$, $A_2$ and $A_3$, together with the nitrogen atoms to which they are attached, form a 5- to 10-membered heterocyclic ring, the resulting ring is for example

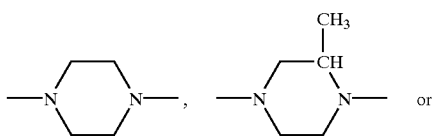

-continued

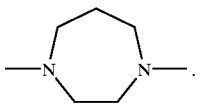

A 6-membered heterocyclic ring is preferred.

Where the radicals $A_4$ and $A_5$, together with the nitrogen atom to which they are attached, form a 5- to 10-membered heterocyclic ring, the resulting ring is for example 1-pyrrolidyl, piperidino, morpholino, 1-piperazinyl, 4-methyl-1-piperazinyl, 1-hexahydroazepinyl, 5,5,7-trimethyl-1-homopiperazinyl or 4,5,5,7-tetramethyl-1-homopiperazinyl. Morpholino is particularly preferred.

One of the preferred meanings of $A_4$ is hydrogen, 2,2,6,6-tetramethyl-4-piperidyl or 1,2,2,6,6-pentamethyl-4-piperidyl.

$A_1$ and $A_3$ are preferably a group of the formula (II), in particular 2,2,6,6-tetramethyl-4-piperidyl or 1,2,2,6,6-pentamethyl-4-piperidyl.

$A_6$ is preferably hydrogen, $C_1$–$C_4$alkyl, —OH, $C_6$–$C_{12}$alkoxy, $C_5$–$C_8$cycloalkoxy, allyl, benzyl or acetyl, in particular hydrogen or $C_1$–$C_4$alkyl, e.g. hydrogen or methyl.

$n_1$ is preferably a number from 2 to 25.

$n_2$ is preferably a number from 2 to 25, especially 2 to 20 or 2 to 10.

When the stabilizer mixture contains the two components a) and b), the group —N($A_4$)($A_5$) is preferably hydrogen, $C_1$–$C_{12}$alkyl, a group of the formula (II) or morpholino.

When the stabilizer mixture contains the two components a) and b), the group —N($A_4$)($A_5$) is in particular

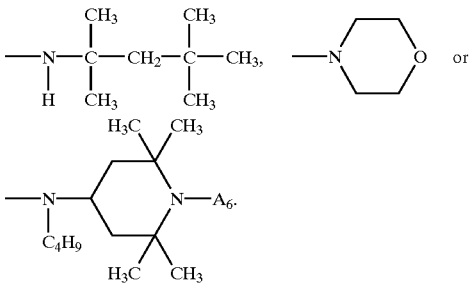

The compounds of components a), b) and c) are known and most of them are commercially available. The compounds of component a) can be prepared, for example, in analogy to the methods described in U.S. Pat. Nos. 4,086,204, 4,331,586 or EP-A-782,994. The compounds of component b) can be prepared, for example, in analogy to the method described in U.S. Pat. No. 4,233,412. The compounds of component c) can be prepared, for example, in analogy to the method described in U.S. Pat. No. 4,108,829.

Component a) is e.g. ®CHIMASSORB 944, ®CHIMASSORB 2020, ®CYASORB UV 3346 or ®DASTIB 1082, in particular ®CHIMASSORB 944, ®CHIMASSORB 2020 or ®CYASORB UV 3346; component b) is preferably ®TINUVIN 622; and component c) is preferably ®CHIMASSORB 119.

When the stabilizer mixture contains the two components a) and b), component a) is different from ®DASTIB 1082.

The products disclosed in EP-A-782,994, which have a narrow molecular weight distribution with a well defined polydispersity $\overline{Mw}/\overline{Mn}$ of 1.1 to 1.7 are also preferred as component a). EP-A-782,994 is equivalent to U.S. patent application Ser. No. 08/756,225 filed on Nov. 25, 1996, which is incorporated herein by reference.

A stabilizer mixture containing ®CHIMASSORB 944 and ®TINUVIN 622 is commercially available as ®TINU- VIN 783 and a stabilizer mixture containing ®TINUVIN 622 and ®CHIMASSORB 119 is commercially available as ®TINUVIN 111. These mixtures are particularly preferred.

Further preferred embodiments relate to the following combinations of stabilizers:

1) the mixture of ®CHIMASSORB 944 and ®CHIMASSORB 119,
2) the mixture of ®CHIMASSORB 2020 and ®TINUVIN 622,
3) the mixture of ®CHIMASSORB 2020 and ®CHIMASSORB 119,
4) the mixture of ®CYASORB UV 3346 and ®TINUVIN 622,
5) the mixture of ®CYASORB UV 3346 and ®CHIMASSORB 119, and
6) the mixture of ®DASTIB 1082 and ®CHIMASSORB 119.

In general, the weight ratio of the two different components which form the stabilizer mixture is 1:20 to 20:1, e.g 1:10 to 10:1, preferably 1:5 to 5:1, in particular 1:2 to 2:1.

The definition of the terminal groups which saturate the free valences in the compounds of the formulae (I) and (III) depend on the processes used for their preparation. The terminal groups can also be modified after the preparation of the compounds.

In the compounds of the formula (I), the terminal group bonded to the diamino radical is for example hydrogen or

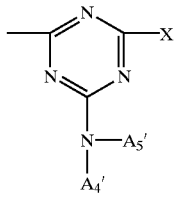

with

X being halogen, especially chlorine, and $A_4'$ and $A_5'$ having one of the definitions given above for $A_4$ and $A_5$, and the terminal group bonded to the triazine radical is for example X or

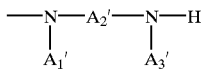

with $A_1'$ and $A_3'$ having one of the definitions given above for $A_1$ and $A_3$, and $A_2'$ having one of the definitions given above for $A_2$.

If X is halogen, it is advantageous to replace it, for example, by —OH or an amino group. Examples of amino groups which may be mentioned are pyrrolidin-1-yl, morpholino, —NH$_2$, —N(C$_1$–C$_8$alkyl)$_2$ and —N(A)(C$_1$–C$_8$alkyl) in which A is hydrogen or a group of the formula (II).

In the compounds of the formula (III), the terminal group bonded to the 2,2,6,6-tetramethyl-4-oxy-1-piperidyl radical is for example hydrogen or —CO—A$_8$—COOQ with Q being e.g. methyl, ethyl or propyl, and the terminal group bonded to the diacyl radical is for example —OQ or a group

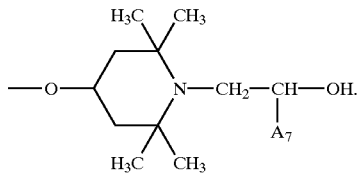

A preferred embodiment relates to a composition wherein $A_1$, $A_3$, $A_4$ and $A_5$ independently of one another are hydrogen, C$_1$–C$_8$alkyl, C$_5$–C$_8$cycloalkyl, methyl-substituted C$_5$–C$_8$cycloalkyl, phenyl, C$_7$–C$_9$phenylalkyl or a group of the formula (II), or the radicals $A_4$ and $A_5$, together with the nitrogen atom to which they are attached, form a 6-membered heterocyclic ring, $A_2$ is C$_2$–C$_{10}$alkylene, and $n_1$ is a number from 2 to 25;

$A_7$ is hydrogen or methyl, $A_8$ is ethylene; and $n_2$ is a number from 2 to 25; and $A_9$ and $A_{13}$ independently of one another are hydrogen or C$_1$–C$_4$alkyl, $A_{10}$, $A_{11}$ and $A_{12}$ independently of one another are C$_2$–C$_6$alkylene, and $A_{14}$ is hydrogen, C$_1$–C$_6$alkyl, C$_5$–C$_8$cycloalkyl, methyl-substituted C$_5$–C$_8$cycloalkyl, phenyl, C$_7$–C$_9$phenylalkyl or a group of the formula (II).

A particularly preferred embodiment relates to a composition wherein component a) is at least one compound of the formula (I-1), (I-2), (I-3) or (I-4);

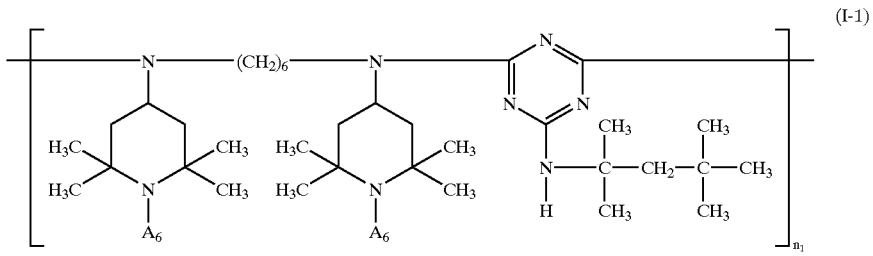

(I-1)

-continued
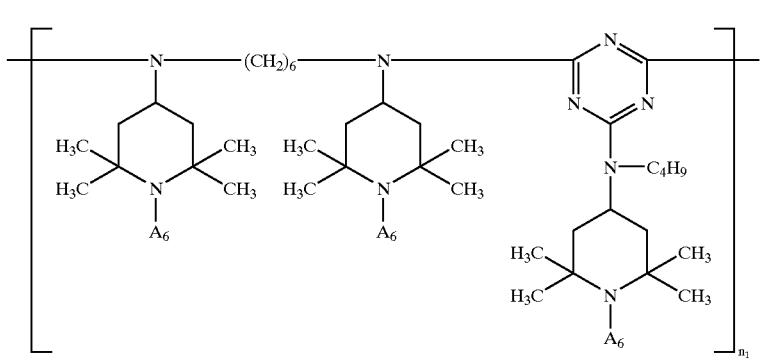
(I-2)
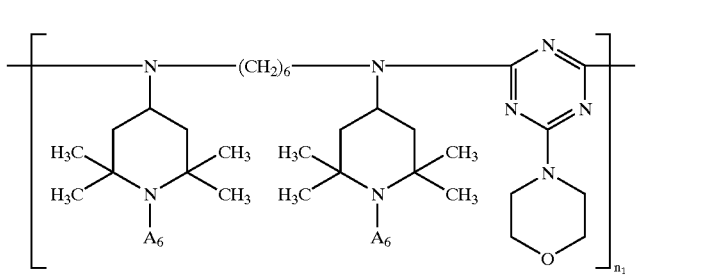
(I-3)
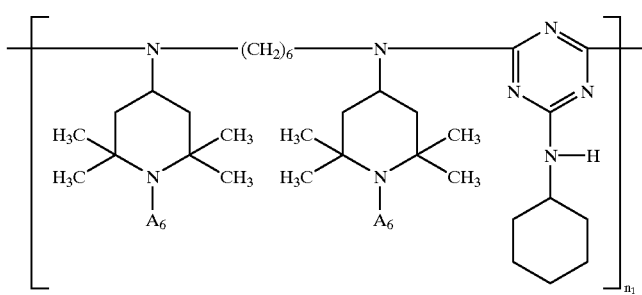
(I-4)
wherein $A_6$ is hydrogen or $C_1$–$C_4$alkyl and $n_1$ is a number from 2 to 25;
component b) is a compound of the formula (III-1)
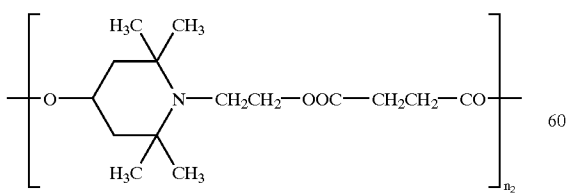
(III-1)
wherein $n_2$ is a number from 2 to 25; and
component c) is at least one compound of the formula (IV-1)

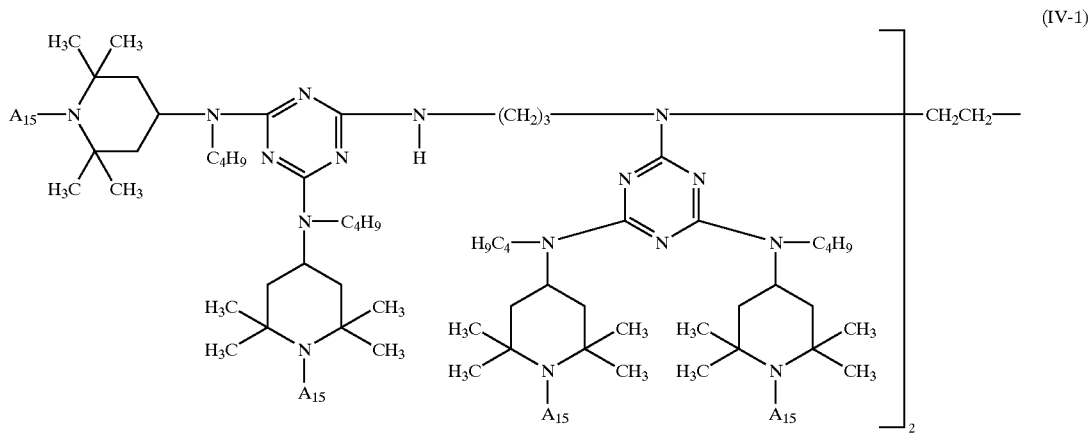

(IV-1)

wherein $A_{15}$ is hydrogen or $C_1$–$C_4$alkyl.

More detailed, the composition according to the present invention contains the components a) and b), or the components a) and c), or the components b) and c).

A composition wherein the stabilizer mixture comprises the compounds

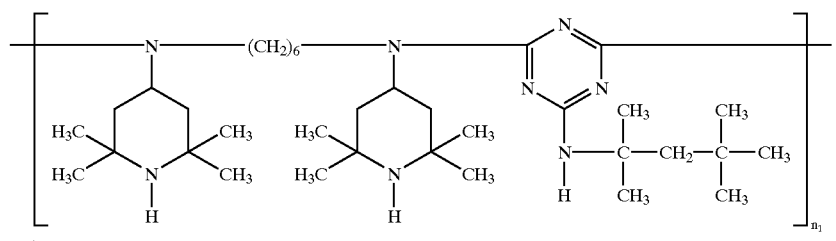

and

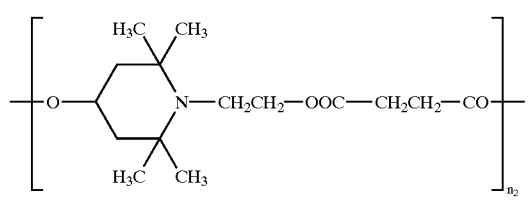

with $n_1$ and $n_2$ being a number from 2 to 25, is also preferred.

A composition wherein the stabilizer mixture comprises the compounds

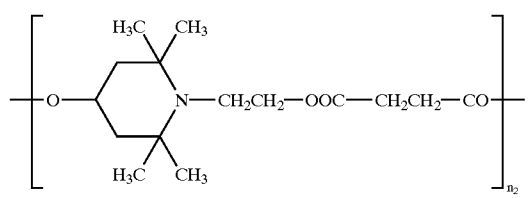

and

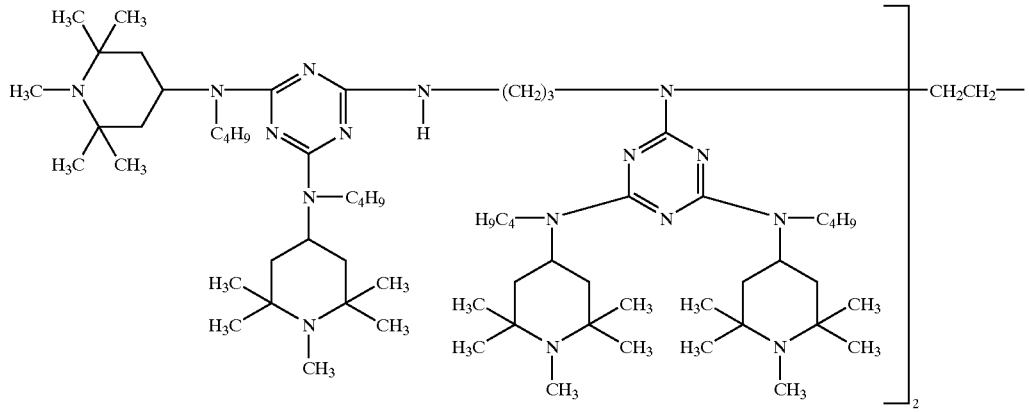

with $n_2$ being a number from 2 to 25, is further preferred.

Polyolefins prepared by polymerization over a metallocene catalyst, more detailed a transition metallocene catalyst, are commercially available. They are also known under the name "metallocene polyolefin". One example is ®Luflexen.

Catalyst systems based on a transition metallocene complex have made it possible to prepare either polymers with a particularly narrow molecular weight distribution or (co) polymers with a particular structure. These systems can be either homogeneous catalyst systems or supported catalysts. More details on the possible catalyst systems can be found, for example, in EP-A-563,917, EP-A-578,838, U.S. Pat. Nos. 4,659,685, 5,240,894 and WO-A-92/333.

Some representative explanations directed to metallocene catalysts and the polyolefins prepared by polymerization over those catalysts are given in the following.

The olefins which can be polymerized over a metallocene catalyst are in particular ethylene and α-olefins, for example propylene, 1-butene, 4-methyl-1-pentene, 5-methyl-1-hexene, isohexene, isooctene, cycloolefins (cyclopentadiene (monomeric or dimeric) or norbornene) or styrene, and mixtures of olefins, for example ethylene-propylene or propylene mixed with minor amounts of higher α-olefins. In this case preference is given to $C_2$- or $C_3$ olefins and their copolymers.

The transition metallocene catalysts are, for example, compounds of the formula (A)

in which a is 1 or 2 and n and q independently of one another are each an integer from 1 to 4, M is the cation of a monovalent to tetravalent metal from group IVb to VIIb, VIII or Ib of the Periodic Table of the Elements, m is an integer corresponding to the valency of L+q, Q is a halogen atom, L is a divalent to heptavalent metal or nonmetal, $R_1$ is a π-arene and $R_2$ is a π-arene or the anion of a π-arene. Particularly suitable π-arenes $R_1$ and $R_2$ are aromatic groups having 6 to 24 carbon atoms or heteroaromatic groups having 3 to 30 carbon atoms, it being possible for these groups to be substituted one or more times by identical or different monovalent radicals, such as halogen atoms, preferably chlorine or bromine atoms, or $C_1$–$C_8$alkyl, $C_1$–$C_8$alkoxy, cyano, $C_1$–$C_8$alkylthio, $C_2$–$C_6$monocarboxylic acid alkyl ester, phenyl, $C_2$–$C_5$alkanoyl or benzoyl groups. These π-arene groups can be monocyclic, fused polycyclic or unfused polycyclic systems, where in the latter systems the rings can be linked directly or via bridging members such as —S— or —O—.

$R_2$ as the anion of a π-arene can be an anion of a π-arene of the abovementioned type, for example the indenyl anion and, in particular, the cyclopentadienyl anion, it being possible for these anions too to be substituted one or more times by identical or different monovalent radicals such as $C_1$–$C_8$alkyl, $C_2$–$C_6$monocarboxylic acid alkyl ester, cyano, $C_2$–$C_5$alkanoyl or benzoyl groups.

The alkyl, alkoxy, alkylthio, monocarboxylic acid alkyl ester and alkanoyl substituents can be straight-chain or branched. Typical alkyl, alkoxy, alkylthio, monocarboxylic acid alkyl ester and alkanoyl substituents are methyl, ethyl, n-propyl, isopropyl, n-butyl, sec-butyl, tert-butyl, n-pentyl, n-hexyl and n-octyl, methoxy, ethoxy, n-propoxy, isopropoxy, n-butoxy, n-hexyloxy and n-octyloxy, methylthio, ethylthio, n-propylthio, isopropylthio, n-butylthio, n-pentylthio and n-hexylthio, carboxylic acid methyl, ethyl, n-propyl, isopropyl, n-butyl and n-pentyl ester, and acetyl, propionyl, butyryl and valeroyl. Among these, preference is given to alkyl, alkoxy, alkylthio and monocarboxylic acid alkyl ester groups having 1 to 4 carbon atoms, in particular 1 or 2 carbon atoms, in the alkyl moieties, and to alkanoyl groups having 2 or 3 carbon atoms. Preferred substituted π-arenes or anions of substituted π-arenes are those containing one or two of the abovementioned substituents, especially chlorine or bromine atoms, methyl, ethyl, methoxy, ethoxy, cyano, carboxylic acid methyl or ethyl ester groups and acetyl groups.

The π-arenes $R_1$ and $R_2$ can be identical or different. Suitable heteroaromatic π-arenes are systems containing S, N and/or O atoms. Heteroaromatic π-arenes containing S and/or O atoms are preferred.

Examples of suitable π-arenes are benzene, toluene, xylenes, ethylbenzene, methoxybenzene, ethoxybenzene, dimethoxybenzene, p-chlorotoluene, chlorobenzene, bromobenzene, dichlorobenzene, acetylbenzene, trimethylbenzene, trimethoxybenzene, naphthalene, 1,2-dihydronaphthalene, 1,2,3,4-tetrahydronaphthalene, methylnaphthalenes, methoxynaphthalenes, ethoxynaphthalenes, chloronaphthalenes, bromonaphthalenes, biphenyl, indene, biphenylene, fluorene, phenanthrene, anthracene, 9,10-dihydroanthracene, triphenylene, pyrene, naphthacene, coronene, thiophene, chromene, xanthene, thioxanthene, benzothiophene, naphthothiophene, thianthrene, diphenylene oxide, diphenylene sulfide, acridine and carbazole.

If a is 2, $R_2$ is preferably in each case the anion of a π-arene and M is in each case the same metal atom.

Examples of anions of substituted π-arenes are the anions of methyl-, ethyl-, n-propyl- and n-butylcyclopentadiene, the anions of dimethylcyclopentadiene, of cyclopentadienecarboxylic acid methyl and ethyl ester, and also of acetylcyclopentadiene, propionylcyclopentadiene, cyanocyclopentadiene and benzoylcyclopentadiene. Preferred anions are the anion of unsubstituted indene and, in particular, that of unsubstituted cyclopentadiene.

Preferably, a is 1, $R_2$ is benzene, toluene, xylene, methoxybenzene, chlorobenzene, p-chlorotoluene, naphthalene, methylnaphthalene, chloronaphthalene, methoxynaphthalene, biphenyl, indene, pyrene or diphenylene sulfide and $R_2$ is the anion of cyclopentadiene, acetylcyclopentadiene or indene or is benzene, toluene, xylene, trimethylbenzene, naphthalene or methylnaphthalene.

Particularly preferred complexes of the formula (A) are those in which a is 1, $R_1$ is $\eta^6$-pyrene or $\eta^6$-naphthalene and $R_2$ is the anion of $\eta^5$-cyclopentadiene, n is preferably 1 or 2, in particular 1, and q is preferably 1. M is for example $Ti^{2+}$, $Ri^{3+}$, $Ti^{4+}$, $Zr^+$, $Zr^{2+}$, $Zr^{3+}$, $Zr^{4+}$, $Hf^+$, $Hf^{2+}$, $Hf^{3+}$, $Hf^{4+}$, $Nb^+$, $Nb^{2+}$, $Nb^{3+}$, $Cr^+$, $Mo^+$, $Mo^{2+}$, $W^+$, $W^{2+}$, $Mn^{30}$, $Mn^{2+}$, $Re^+$, $Fe^{2+}$, $Co^{2+}$, $Co^{3+}$, $Ni^{2+}$ or $Cu^{2+}$. M is preferably a titanium, zirconium or hafnium cation, especially a titanium or zirconium cation, and with particular preference is $Ti^{4+}$ or $Zr^{4+}$.

Examples of suitable metals or nonmetals L are Sb, Fe, Sn, Bi, Al, Ga, In, Ti, Zr, Sc, V, Cr, Mn and Cu; lanthanides such as Ce, Pr and Nd or actinides such as Th, Pa, U or Np. Particularly suitable nonmetals are B, P and As. L is preferably P, As, B or Sb, with P being particularly preferred.

Complex anions $[Lqm]^{q-}$ are, for example, $BF_4^-$, $PF_6^-$, $AsF_6^-$, $SbF_6^-$, $FeCl_4^-$, $SnCl_6^-$, $SnCl_6^-$ and $BiCl_6^-$. The particularly preferred complex anions are $SbF_6^-$, $BF_4^-$, $AsF_6^-$ and $PF_6^-$.

The compounds of the formula (A) can be prepared by methods known per se, for example by reacting a compound of the formula (B)

$$\{[(R_1(R_2M)_a]^{pn+}an/q[X]^{q-}\} \quad (B)$$

with a salt of an anion $$[LQ_m]^{q-}$$

in which a, m, n, q, $R_1$, $R_2$, M and L are as defined under the formula (A) and $[X]^{q-}$ is an anion which is different from $[LQ_m]^{q-}$.

Both the compounds of the formula (B) and the compounds of the formula (C)

$$\{[(R'_1)(R_2M_a]\} \quad (C)$$

in which a and M are as defined above and $R'_1$ is a $\pi$-arene or the anion of a $\pi$-arene and $R_2$ is an anion of a $\pi$-arene, can be prepared by reacting identical or different $\pi$-arenes in the presence of a Lewis acid with a salt of a metal from group IVb to VIIb, VII or Ib of the Periodic Table. The compounds of the formulae (A), (B) and (C) are also suitable for carrying out a ligand exchange, by reacting these compounds in the presence of a Lewis acid with a $\pi$-arene which is different from $R_1$ and/or $R_2$, or $R'_1$. In such cases, n is preferably 2 and particularly preferably 1.

Compounds of the formula (A) in which L is a metal can be prepared by reacting identical or different $\pi$-arenes in the presence of a Lewis acid with a suitable salt of a metal from group IVb to VIIb, VII or Ib of the Periodic Table of the Elements, for example a titanium, zirconium, chromium, manganese or, in particular, iron salt. Finally, compounds of the formula (A) can also be converted in a customary manner, by anion exchange, into complexes of the formula (A) with a different anion $[LQ_m]^{q-}$.

In a preferred embodiment the starting materials employed are uncharged $\pi$-complexes of the formula (C), for example ferrocene or bis($\eta^5$-indenyl)iron(II), and these starting materials are converted by ligand exchange into a complex of the formula (B), which is subsequently reacted with a salt of an anion $[LQ_m]^{q-}$. The complex of the formula (B) obtained as intermediate in this procedure is normally not isolated.

Examples of suitable salts of anions $[LQ_m]^{q-}$ are alkali metal, alkaline earth metal or ammonium salts. It is preferred to use alkali metal salts, and particularly preferably sodium salts and potassium salts.

Examples of suitable Lewis acids for the reactions described above are $AlCl_3$, $AlBr_3$, $BF_3$, $SnCl_4$ and $TiCl_4$, preferably $AlCl_3$. It can be advantageous to carry out the ligand exchange reaction with the addition of a reducing agent, for example aluminium or magnesium, to the reaction mixture, or to add a reducing agent, for example $Na_2SO_3$ or ascorbic acid, to the reaction mixture subsequently. Aluminium is the preferred reducing agent. The ligand exchange reactions are expediently carried out in an inert organic solvent. Examples of suitable solvents are aliphatic or cycloaliphatic hydrocarbons such as octane, nonane, decane and cyclohexane. If desired, an excess of $\pi$-arene can also be employed as solvent.

The reaction of the compounds of the formula (B) with a salt of an anion $[LQ_m]^{q-}$ and the anion exchange conversion of compounds of the formula (A) are expediently carried out in an aqueous or aqueous alcoholic medium, for example in mixtures of water and methanol or ethanol. The salts of the anions $[LQ_m]^{q-}$ are employed at least in stoichiometric amounts but preferably in excess.

For the polymerization, it is additionally possible to use a metallocene catalyst consisting of two principal components (A-1 and A-2).

Of these, component A-1 is a metallocene compound. It is possible in principle to employ any metallocene regardless of its structure and composition. The metallocenes can be either bridged or unbridged, and can have identical or different ligands. The compounds involved are those of the metals of groups IVb, Vb or VIb of the Periodic Table, for example compounds of titanium, zirconium, hafnium, vanadium, niobium, tantalum, chromium, molybdenum and tungsten, preferably of zirconium, hafnium and titanium, especially zirconium.

Such metallocenes are known and are described, for example, in the following documents: EP-A-336,127, EP-A-336,128, EP-A-387,690, EP-A-387,691, EP-A-302,424, EP-A-129,368, EP-A-320,762, EP-A-284,707, EP-A-316, 155, EP-A-351,392, U.S. Pat. No. 5,017,714, J. Organomet, Chem., 342 (1988) 21.

Metallocenes worthy of emphasis are those of the general structure

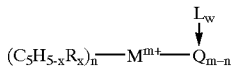

in which $M^{m+}$ is an m-valent cation of a metal of groups IVb, V or VIb of the Periodic Table, for example titanium, zirconium, hafnium, vanadium, niobium, tantalum, chromium, molybdenum or tungsten, preferably zirconium, hafnium or titanium, especially zirconium;

$(C_5H_{5-x}R_x)$ is a cyclopentadienyl ring substituted with from zero to five substituents R;

x is zero, one, two, three, four or five;

n is one or two;

each R, independently of the others, is a $C_1$–$C_{20}$ hydrocarbon radical, a $C_1$–$C_{20}$ hydrocarbon radical substituted by one or more halogen atoms, a metalloid-substituted $C_1$–$C_{20}$ hydrocarbon radical or halogen; or two adjacent radicals R are a $C_4$–$C_{20}$ ring;

or, if n is 1, alternatively a radical $B_y$-$JR'_{z-1-y}$, in which
J is an element of group Va of the Periodic Table of coordination number 3 or an element of group VIa of the Periodic Table of coordination number 2, preferably N, P, O or S;
each R', independently of the others, is a $C_1$–$C_{20}$ hydrocarbon radical or a $C_1$–$C_{20}$ hydrocarbon radical which is substituted by one or more halogen atoms;
z is the coordination number of the element J;
y is zero or one;
B, if y is one, is a bridging member comprising an element of group IVA or VA of the Periodic Table, for example $C_1$–$C_{20}$alkylene, a $DiC_1$–$C_{20}$alkyl-, $C_7$–$C_{20}$alkylaryl- or $DiC_6$–$C_{20}$arylsilicon or germanium radical or an alkyl- or aryl-phosphine or amine radical;
or R, if n is two, is a group selected from —$M_2(R_{10})(R_{11})$—, —$M_2(R_{10})(R_{11})$—$M_2(R_{10})(R_{11})$——$C(R_{10})(R_{11})$—$C(R_{10})(R_{11})$—, —O—$M_2(R_{10})(R_{11})$—O—, —$C(R_{10})(R_{11})$—, —O—$M_2(R_{10})(R_{11})$—, —$C(R_{10})(R_{11})$—$M_2(R_{10})(R_{11})$, —$B(R_{10})$—, —$Al(R_{10})$—, —Ge—, —Sn—, —O—, —S—, —S(O)—, —$S(O)_2$—, —$N(R_{10})$—, —C(O)—, —$P(R_{10})$— or —$P(O)(R_{10})$—; in which
$R_{10}$ and $R_{11}$ are identical or different and are a hydrogen atom, a halogen atom, a $C_1$–$C_{10}$alkyl, $C_1$–$C_{10}$fluoroalkyl, $C_6$–$C_{10}$aryl, $C_6$–$C_{10}$fluoroaryl, $C_1$–$C_{10}$alkoxy, $C_2$–$C_{10}$alkenyl, $C_7$–$C_{40}$arylalkyl, $C_8$–$C_{40}$arylalkenyl or $C_7$–$C_{40}$alkylaryl group or $R_{10}$ and $R_{11}$, in each case with the atoms which join them, form a ring, and
$M_2$ is silicon, germanium or tin,
each Q, independently of the others, is hydrogen, a $C_1$–$C_{50}$ hydrocarbon radical, a $C_1$–$C_{50}$ hydrocarbon radical which is substituted with one or more electron-withdrawing groups, for example halogen or alkoxy, or a metalloid-substituted $C_1$–$C_{50}$ hydrocarbon radical, the metalloid being an element of group IVA of the Periodic Table, with the exception of hydrocarbon radicals of the formula $(C_5H_{5-x}R_x)$; or two radicals Q are alkylidene, olefin, acetylene or a cyclometallated hydrocarbon radical;
L is a neutral Lewis base, for example diethyl ether, tetrahydrofuran, dimethylaniline, aniline, trimethylphosphine or n-butylamine; and
w is from 0 to 3.

The term metalloid refers, for example, to the elements silicon, germanium, tin and lead.

In this context, a preferred type of metallocene corresponds to the following structure:

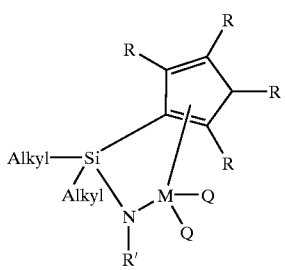

in which M is Ti or Zr and the other substituents are as defined above.

Further details on metallocenes of the above type can also be found in WO-A-92/333.

For the isospecific polymerization of substituted olefins, for example propene, butene and styrene, and their copolymerization, including that with other olefins, the metallocenes which are of interest, especially zirconocenes, are those which carry indenyl derivatives as ligands. These are preferably the compounds of the following formula (1)

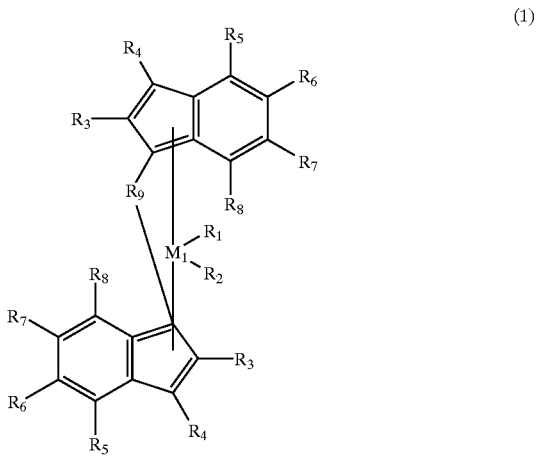

in which
$M_1$ is a metal of group IVb, Vb or VIb of the Periodic Table;
$R_1$ and $R_2$ are identical or different and are a hydrogen atom, a $C_1$–$C_{10}$alkyl, $C_1$–$C_{10}$alkoxy, $C_6$–$C_{10}$aryl, $C_6$–$C_{10}$aryloxy, $C_2$–$C_{10}$alkenyl, $C_7$–$C_{40}$arylalkyl, $C_7$–$C_{40}$alkylaryl, $C_8$–$C_{40}$arylalkenyl or OH group or a halogen atom, and the radicals $R_3$ are identical or different and are a hydrogen atom, a halogen atom, a $C_1$–$C_{10}$alkyl group which can be halogenated, a $C_6$–$C_{10}$aryl group, or a radical —$NR_2$, —SR, —$OSiR_3$, —$SiR_3$ or $PR_2$, in which R is a halogen atom, a $C_1$–$C_{10}$alkyl group or a $C_6$–$C_{10}$aryl group.
$R_4$ to $R_8$ are as defined for $R_3$, or adjacent radicals $R_4$ to $R_8$ form, with the atoms connecting them, an aromatic or aliphatic ring,
$R_9$ is a group selected from —$M_2(R_{10})(R_{11})$—, —$M_2(R_{10})(R_{11})$—$M_2(R_{10})(R_{11})$—, —$C(R_{10})(R_{11})$—$C(R_{10})(R_{11})$—, —O—$M_2(R_{10})(R_{11})$—O—, —$C(R_{10})(R_{11})$—, —O—$M_2(R_{10})(R_{11})$—, —$C(R_{10})(R_{11})$—$M_2(R_{10})(R_{11})$—, —$B(R_{10})$—, —$Al(R_{10})$—, —Ge—, —Sn—, —O—, —S—, —S(O)—, —$S(O)_2$—, —$N(R_{10})$ —C(O)—, —$P(R_{10})$— or —$P(O)(R_{10})$—; in which
$R_{10}$ and $R_{11}$ are identical or different and are a hydrogen atom, a halogen atom, a $C_1$–$C_{10}$alkyl, $C_1$–$C_{10}$fluoroalkyl, $C_6$–$C_{10}$aryl, $C_6$–$C_{10}$fluoroaryl, $C_1$–$C_{10}$alkoxy, $C_2$–$C_{10}$alkenyl, $C_7$–$C_{40}$arylalkyl, $C_8$–$C_{40}$arylalkenyl or $C_7$–$C_{40}$alkylaryl group or $R_{10}$ and $R_{11}$ in each case with the atoms connecting them, form a ring, and
$M_2$ is silicon, germanium or tin.

The 4,5,6,7-tetrahydroindenyl analogues corresponding to the compounds of the formula (1) are also of importance. Preferably, in formula (1),
$M_1$ is zirconium,
$R_1$ and $R_2$ are identical and are methyl or chlorine, especially chlorine,
$R_3$ to $R_8$ are hydrogen or $C_1$–$C_4$alkyl,
$R_9$ is —$Si(R_{10})(R_{11})$—, —$C(R_{10})(R_{11})$— or —$C(R_{10})(R_{11})$—$C(R_{10})(R_{11})$— and $R_{10}$ and $R_{11}$ are identical or different and are $C_1$–$C_4$alkyl or $C_6$–$C_{10}$aryl. In particular, $R_{10}$ and $R_{11}$ are identical or different and are methyl or phenyl.

The indenyl and/or tetrahydroindenyl ligands in formula (1) are preferably substituted in the 2, 2,4, 4,7, 2,6, 2,4,6, 2,5,6, 2,4,5,6 or 2,4,5,6,7 positions, in particular in the 2,4,6 positions. The substituents are preferably a $C_1$–$C_4$alkyl group such as methyl, ethyl or isopropyl. The 2 position is preferably substituted by methyl.

Also of particular importance are those compounds of the formula (1) in which the substituents in positions 4 and 5 of the indenyl radicals ($R_5$ and $R_6$) form, together with the atoms connecting them, a benzene ring. This fused ring system can likewise be substituted by radicals having the definitions of $R_3$–$R_8$. An example of such compounds I is dimethylsilanediylbis(2-methyl-4,5-benzoindenyl) zirconium dichloride.

The metallocenes of the formula (1) are particularly suitable for the preparation of high molecular weight polyolefins of high stereoregularity.

Also of particular importance are compounds of the formula (1) with (substituted) phenyl or naphthyl substituted in position 4.

For the syndiospecific polymerization of substituted olefins, for example propene, butene and styrene, and their copolymerization, including that with other olefins, the metallocenes of interest are those of the formula (2):

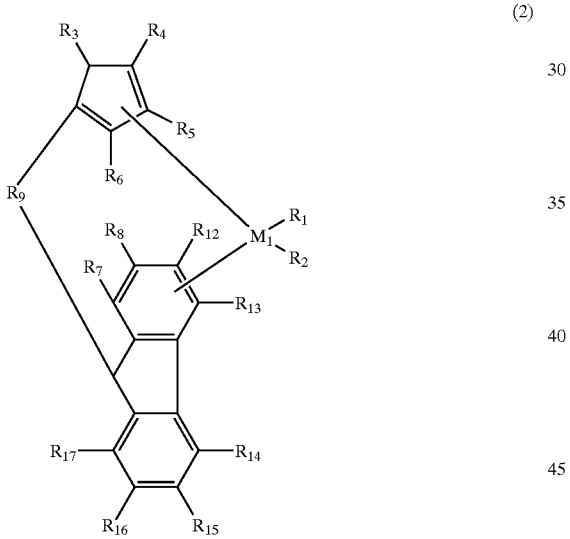

(2)

in which
  $M_1$ is a metal of group IVb, Vb or VIb of the Periodic Table;
  $R_1$ and $R_2$ are identical or different and are a hydrogen atom, a $C_1$–$C_{10}$alkyl, $C_1$–$C_{10}$alkoxy, $C_6$ $C_{10}$aryl, $C_6$–$C_{10}$aryloxy, $C_2$–$C_{10}$alkenyl, $C_7$–$C_{40}$arylalkyl, $C_7$–$C_{40}$alkylaryl, $C_8$–$C_{40}$aralkenyl or OH group or a halogen atom, and the radicals $R_3$ are identical or different and are a hydrogen atom, a halogen atom, a $C_1$–$C_{10}$alkyl group which can be halogenated, a $C_6$–$C_{10}$aryl group, or a radical —NR$_2$, —SR, —OSiR$_3$, —SiR$_3$ or PR$_2$, in which R is a halogen atom, a $C_1$$C_{10}$alkyl group or a $C_6$–$C_{10}$aryl group.
  $R_4$ to $R_8$ are as defined for $R_3$, or adjacent radicals $R_4$ to $R_8$ form, with the atoms connecting them, an aromatic or aliphatic ring,
  $R_9$ is a group selected from —M$_2$(R$_{10}$)(R$_{11}$)—, —M$_2$(R$_{10}$)(R$_{11}$)—M$_2$(R$_{10}$)(R$_{11}$)—, —C(R$_{10}$)(R$_{11}$)—C(R$_{10}$)(R$_{11}$)—, —O—M$_2$(R$_{10}$)(R$_{11}$)—O—, —C(R$_{10}$)(R$_{11}$)—, —O—M$_2$(R$_{10}$)(R$_{11}$)—, —C(R$_{10}$)(R$_{11}$)—M$_2$(R$_{10}$)(R$_{11}$)—, —B(R$_{10}$)—, —Al(R$_{10}$)—, —Ge—, —Sn—, —O—, —S—, —S(O)—, —S(O)$_2$—, —N(R$_{10}$)—, —C(O)—, —P(R$_{10}$)— or —P(O)(R$_{10}$)—; in which $R_{10}$ and $R_{11}$ are identical or different and are a hydrogen atom, a halogen atom, a $C_1$–$C_{10}$alkyl, $C_1$–$C_{10}$fluoroalkyl, $C_6$–$C_{10}$aryl, $C_6$–$C_{10}$fluoroaryl, $C_1$–$C_{10}$alkoxy, $C_2$–$C_{10}$alkenyl, $C_7$–$C_{40}$arylalkyl, $C_8$–$C_{40}$arylalkenyl or $C_7$–$C_{40}$alkylaryl group or $R_{10}$ and $R_{11}$, in each case with the atoms connecting them, form a ring, and $M_2$ is silicon, germanium or tin; and $R_{12}$ to $R_{17}$ are as defined for $R_3$.

Examples of metallocenes which can be used for the polymerization are the following compounds:

biscyclopentadienylzirconium dichloride, biscyclopentadienylzirconiumdimethyl, biscyclopentadienylzirconiumdiphenyl, biscyclopentadienylzirconiumdibenzyl, biscyclopentadienylzirconiumbistrimethylsilyl, bis(methylcyclopentadienyl)zirconium dichloride, bis(1,2-dimethylcyclopentadienyl)zirconium dichloride, bis(1,3-dimethyl-cyclopentadienyl)zirconium dichloride, bis(1,2,4-trimethylcyclopentadienyl)zirconium dichloride, bis(1,2,3-trimethylcyclopentadienyl) zirconium dichloride, bis(pentamethyl-cyclopentadienyl)zirconium dichloride, bisindenylzirconium dichloride, bis(tetrahydro-indenyl)zirconium dichloride, dimethylsilylbis-1-tetrahydroindenylzirconium dichloride, dimethylsilylbis-1-(2-methyltetrahydroindenyl) zirconium dichloride, dimethylsilylbis-1-(2,3,5-trimethylcyclopentadienyl)zirconium dichloride, dimethylsilylbis-1-(2,4-dimethyl-cyclopentadienyl) zirconium dichloride, dimethylsilylbis-1-indenylzirconium dichloride, dimethylsilylbis-1-indenylzirconiumdimethyl, dimethylgermylbis-1-indenylzirconium dichloride, dimethylsilylbis-1-(2-methylindenyl)zirconium dichloride, dimethylsilylbis-1-(2-methyl-4-isopropylindenyl)zirconium dichloride, phenylmethylsilylbis-1-(2-methylindenyl)-zirconium dichloride, dimethylsilylbis-1-(2-methyl-4-ethylindenyl)zirconium dichloride, ethylenebis-1-(4,7-dimethylindenyl)zirconium dichloride, phenyl(methyl) silylbis-1-indenyl-zirconium dichloride, phenyl(vinyl) silylbis-1-indenylzirconium dichloride, diphenylsilylbis-1indenylzirconium dichloride, dimethylsilylbis(1-(2-methyl-4-tert-butylindenyl)) zirconium dichloride, methylphenylsilylbis(1-(2-methyl-4-isopropylindenyl))zirconium dichloride, dimethylsilylbis(1-(2-ethyl-4-methylindenyl)) zirconium dichloride, dimethylsilylbis(1-(2,4-dimethylindenyl))zirconium dichloride, dimethylsilylbis(1-(2-methyl-4-ethylindenyl))-zirconium dichloride, dimethylsilylbis(2-methyl-4,6-diisopropylindenyl)zirconium di-chloride, dimethylsilylbis(2,4,6-trimethylindenyl)zirconium dichloride, methylphenylsilyl-bis(2-methyl-4,6-diisopropylindenyl)zirconium dichloride, 1,2-ethanediylbis(2-methyl-4,6-diisopropylindenyl) zirconium dichloride, dimethylsilyl(9-fluorenyl) (cyclopentadienyl)-zirconium dichloride, diphenylsilyl (9-fluorenyl)(cyclopentadienyl)zirconium dichloride, diphenylmethylene(9-fluorenyl) cyclopentadienylzirconium dichloride, isopropylidene (9-fluorenyl)cyclopentadienylzirconium dichloride, phenylmethylmethylene(9-fluorenyl) cyclopentadienylzirconium dichloride, isopropylidene (9-fluorenyl)(1-(3-isopropyl)cyclopentadienyl) zirconium dichloride, isopropylidene(9-fluorenyl)(1-(3-methyl)cyclopentadienyl)zirconium dichloride, diphenylmethylene(9-fluorenyl)(1-(3-methyl)cyclopentadienyl)zirconium dichloride, methylphenlymethylene(9-fluorenyl)(1-(3-methy)cyclopentadienyl)zirconium dichloride, dimethylsilyl (9-fluorenyl)-(1-(3-methyl)cyclopentadienyl) zirconium dichloride, diphenylsilyl(9-fluorenyl)-(1-(3-methyl)cyclopentadienyl)zirconium dichloride, diphenylmethylene(9-fluorenyl)(1-(3-tert-butyl) cyclopentadienyl)zirconium dichloride and isopropylidene(9-fluorenyl)(1-(3-tert-butyl) cyclopentadienyl)zirconium dichloride.

In the preparation of the catalyst, chiral metallocenes are preferably employed as a racemate. However, it is also possible to use the pure R or S form. Using these pure stereoisomeric forms, optically active polymer can be prepared. However, the meso form of the metallocenes should be separated off, since the polymerization-active centre (the metal atom) in these compounds is no longer chiral, owing to mirror symmetry at the central metal, and is therefore unable to produce highly tactic polymer. If the meso form is not separated off, atactic polymer is produced in addition to isotactic or syndiotactic polymers. For certain applications, for example flexible mouldings, or for the preparation of polyethylene grades, this may be entirely desirable. The stereoisomers are separated by methods known from the literature.

As component A-2, examples of suitable compounds are the following.
a) Aluminoxanes The aluminoxane used is preferably a compound of the formula (3)

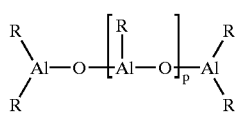

(3)

for the linear type and/or of the formula (4)

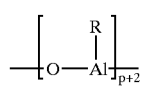

(4)

for the cyclic type, in which formulae (3) and (4) the radicals R can be identical or different and are a $C_1$–$C_6$alkyl group, a $C_6$–$C_{18}$aryl group, benzyl or hydrogen, and p is an integer from 2 to 50, preferably from 10 to 35.

The radicals R are preferably identical and are methyl, isobutyl, n-butyl, phenyl or benzyl, particularly preferably methyl.

Where the radicals R are different, they are preferably methyl and hydrogen, methyl and isobutyl or methyl and n-butyl, with the content of hydrogen or isobutyl or n-butyl preferably being 0.01–40% (number of radicals R).

The aluminoxane can be prepared by known methods in various ways. One of the methods, for example, is the reaction of an aluminium hydrocarbon compound and/or a hydridoaluminium-hydrocarbon compound with water (in gaseous, solid or liquid form or else in bound form, for example as water of crystallization) in an inert solvent (for example toluene). To prepare an aluminoxane with different alkyl groups R, two different aluminium trialkyls ($AlR_3$ + $AlR'_3$), in accordance with the desired composition and reactivity, are reacted with water (cf. S. Pasynkiewicz, Polyhedron 9 (1990) 429 and EP-A-302,424).

The precise structure of the aluminoxanes of the formulae (3) and (4) is unknown.

Regardless of the manner of their preparation, all aluminoxane solutions share the feature of a varying content of unreacted aluminium starting compound, which is present in free form or as an adduct.
b) Ion Exchange Compounds Ion exchange compounds are compounds comprising a cation, which reacts irreversibly with a ligand of component A-1, and a noncoordinating anion, which is bulky, labile and chemically inert. Combining components A-1 and A-2 produces an ion pair formed from the cation of A-2 and a ligand of A-1. Examples of cations of component A-2 are Bronsted acids, such as ammonium ions, or reducible Lewis acids, such as $Ag^+$ or ferrocene ions.

The aluminoxane which can be used as component A-2 can also be produced in the course of the preparation of a supported catalyst from trimethylaluminium.

In addition to homogeneous catalyst systems, the metallocenes can also be used as heterogeneous catalysts. In this case the catalyst is applied to an inorganic or organic carrier by methods known to the person skilled in the art from the literature. Inorganic carrier materials are preferably silica gels; further details on this can be found, for example, in U.S. Pat. No. 5,240,894.

Examples of organic carrier materials are microporous polymeric carriers which are obtainable commercially (e.g. the ®Accurel grades from AKZO, such as ®Accurel-PE, ®Accurel-PP, ®Accurel-PA-6 or ®Accurel-PA-12 with a voids content of about 75% by volume). The pore size of the ®Accurel materials is 0.5–5 µm (PP), 1.0–5 µm (HDPE), or 0.5–3 µm (PA-6 and PA-12).

The microporous polymeric carrier is advantageously dried beforehand, for example by treatment with aluminium alkyl solutions, then washed and rendered inert under a protective gas.

The preferred procedure for this is first to react the aluminoxane in an appropriate solvent, for example pentane, hexane, heptane, toluene or dichloromethane, with at least one metallocene, by intensive mixing, for example by stirring. The reaction temperature is preferably from −20 to +120° C., in particular 15–40° C. The molar ratio of aluminium to transition metal M of the metallocene is preferably between 10:1 and 10,000:1, in particular between 100:1 and 2000:1. The reaction time is in general between 5 and 120 minutes, preferably 10–30 minutes. The reaction is preferably operated with an aluminium concentration of more than 0.01 mol/liter, in particular more than 0.5 mol/liter. The reaction is carried out under inert conditions.

In place of the aluminoxane it is also possible to use a mixture of an aluminoxane with a further aluminium alkyl compound, for example trimethyl-, triethyl- or triisobutylaluminium, for the described reaction with the metallocene.

After the reaction has taken place it is possible, for example, to remove part of the solvent under vacuum or, following concentration, to replace the solvent by a different solvent. The solution thus prepared is reacted in a suitable manner with the microporous polymeric carrier. In this context, the carrier is added at least in an amount whose total pore volume is able to take up the solution from the previous reaction. The reaction referred to in the second sentence of this paragraph is preferably carried out at temperatures of between −20 and +20° C., in particular 15–40° C., by intense mixing, for example by stirring or treatment with ultrasound. Thorough homogenization should be accomplished. In this context, the exchange of the inert gas of the pore volume can be accelerated by brief evacuation, for example.

In principle, the supported catalyst can also be prepared in a one-pot reaction, i.e. all three starting components are reacted with one another simultaneously in an appropriate solvent/suspension medium. In this context, the amount of the polymeric carrier should preferably be calculated such that it is able to take up the entire volume of liquid.

The catalyst can be metered into the polymerization system in suspended form, in an inert suspension medium such as, for example, heptane, n-decane, hexane or diesel oil, or else in dry form, possibly after removal of the remaining solvent by a drying step carried out, for example, under vacuum.

The catalyst can advantageously be prepolymerized in the gaseous phase, in the liquid monomer or in suspension in which case it is possible to omit the addition of a further organoaluminium compound.

Polymerization with these catalysts can be carried out by known methods in liquid or gaseous phase. The liquid phase may, for example, be an aliphatic hydrocarbon or the liquid monomer itself. The metallocene catalysts can also be employed as a mixture with other types of catalyst, for example Ziegler or Phillips catalysts. At the end of the polymerization the catalyst is destroyed, for example by adding water (vapour), wet nitrogen, carbon dioxide or alcohol.

Metallocene polyolefins are further described in "New Trends in Polyolefin Catalysts and Influence on Polymer Stability" (Rolf Mülhaupt; the Twelfth Annual International Conference on Advances in the Stabilization and Controlled Degradation of Polymers, held in Luzern, Switzerland, May 21–23, 1990, pages 181 to 196 of the conference papers).

According to a preferred embodiment of the present invention the polyolefin prepared by polymerization over a metallocene catalyst is polyethylene or polypropylene.

A further preferred embodiment of the present invention relates to a composition which additionally contains a polyolefin not prepared by polymerization over a metallocene catalyst.

Such polyolefins are for example prepared
a) by radical polymerization (normally under high pressure and at elevated temperature); or
b) by catalytic polymerization over a Phillips or Ziegler (-Natta) catalyst.

Low density polyethylene (LDPE; prepared by radical polymerization), linear low density polyethylene (LLDPE; prepared by catalytic polymerization over a Ziegler (-Natta) catalyst) and high density polyethylene (HDPE; prepared by catalytic polymerization over a Phillips catalyst) are particularly preferred.

The weight ratio between the polyolefin prepared by polymerization over a metallocene catalyst to the polyolefin not prepared by polymerization over a metallocene catalyst is for example 1:10 to 10:1.

A further embodiment of this invention is a method for stabilizing a polyolefin prepared by polymerization over a metallocene catalyst, which comprises incorporating into said polyolefin a stabilizer mixture as defined above.

The two components of the stabilizer mixture can be used in various proportions depending on the nature of the polyolefin to be stabilized, on the end use and on the presence of other additives.

In general, it is appropriate to use, for example, 0.01 to 5% by weight of each of the two components of the stabilizer mixture, relative to the weight of the polyolefin to be stabilized, preferably 0.01 to 2%, in particular 0.025 to 1%.

The stabilizer mixture or the individual components can be incorporated into the polyolefin by known methods, for example by dry mixing in the form of powder, or wet mixing in the form of solutions or suspensions or also in the form of a masterbatch which contains the individual components in a concentration of 2.5 to 25% by weight; in such operations, the polyolefin can be used in the form of powder, granules, solutions, suspensions or even in the form of latices.

The stabilizer mixture or the individual components can be added before, during or after the polymerization or crosslinking. Furthermore, they can be incorporated in the polyolefin in the pure form or encapsulated in waxes, oils or polymers.

Before incorporation, the individual components of the stabilizer mixture can also be mixed with one another in a melt or can be extruded with one another.

The polyolefin stabilized with the stabilzer mixture can be used for the production of mouldings, films, tapes, monofilaments, fibres, surface coatings and the like.

If desired, other conventional additives for polyolefins, such as antioxidants, UV absorbers, nickel stabilizers, pigments, fillers, plasticizers, corrosion inhibitors and metal deactivators, can be added to the polyolefin containing the stabilizer mixture described above.

Examples of such conventional additives are listed in the following.

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl)adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)4-nonylphenol], 2,2'-methylenebis(6-(α,α-dimethylbenzyl)-4-nonylphenol], 4,4'- methylenebis-(2,6-di-tert-butylphenol), 4,4'-methylenebis (6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate],bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,2,5-triazine, 1,3,4-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosohonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3.5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tertbutyl-4-hydroxyphenylpropionyl)hexamethylenediamide, N,N'-bis (3,5-di-tert-butyl-4-hydroxyphenylpropionyl) trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1 supplied by Uniroyal).

1.18. Ascorbic Acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, bis[4-(1',3'-dimethylbutyl) phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- und dialkylated tert-butyldiphenylamines, 2,3-dihydro-3,3-dimethyl-4H-1,4-benzothiazine, phenothiazine, a mixture of mono- und dialkylated tert-butyl/-tert-octylphenothiazines, a mixture of mono- und dialkylated tert-octyl-phenothiazines, N-allylphenothiazin, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilisers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3', 5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$-$]_2$— where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(a,a-dimethylbenzyl)-phenyl] benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis (4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.7. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1, 3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy) phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2, 4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4, 6-tris(tert-butylphenyl)pentaerythritol diphosphite, tristearyl sorbitol triphosphite, tetrakis(2,4-di-tert-butyl-phenyl) 4,4'-biphenylene diphosphonite, 6-isooctyloxy-2,4,8,10-tetra-tert-butyl-12H-dibenz-[d,g]-1,3,2-dioxaphosphocin, bis(2, 4-di-tert-butyl-6-methylphenyl)methyl phosphite, bis(2,4-di-tert-butyl-6-methylphenyl)ethyl phosphite, 6-fluoro-2,4, 8,10-tetra-tert-butyl-12-methyl-di-benz[d,g]-1,3,2-dioxaphosphocin, 2,2',2''-nitrilo[triethyltris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

Especially preferred are the following phosphites:

Tris(2,4-di-tert-butylphenyl)phosphite (Irgafos®168, Ciba-Geigy), tris(nonylphenyl) phosphite,

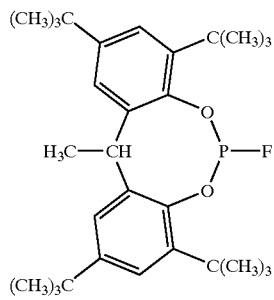
(A)

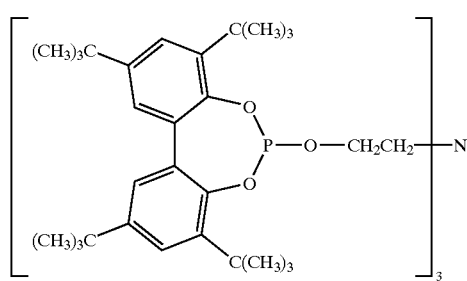
(B)

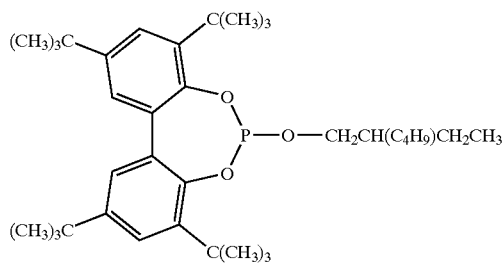
(C)

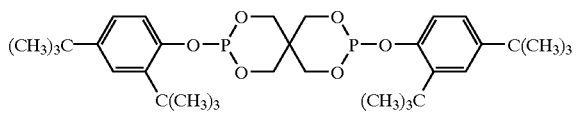
(D)

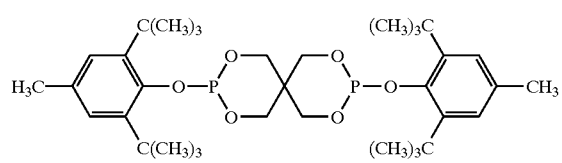
(E)

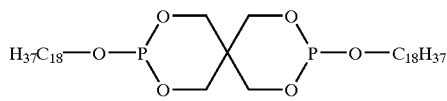
(F)

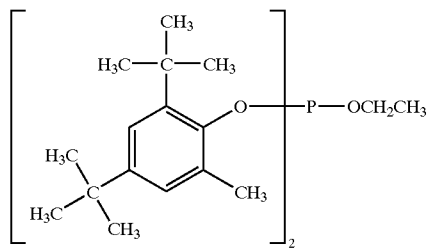
(G)

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example, copper salts in combination with iodides and/or phosphorus compounds and salts of divalent manganese.

10. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or zink pyrocatecholate.

11. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers). Especially preferred are 1,3:2,4-bis(3',4'-dimethylbenzylidene)sorbitol, 1,3:2,4-di(paramethyldibenzylidene)sorbitol, und 1,3:2,4-di(benzylidene)sorbitol.

12. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flowcontrol agents, optical brighteners, flameproofing agents, antistatic agents and blowing agents.

14. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839 or EP-A-0591102 or 3-[4-(2-acetoxyethoxy)phenyl]-5,7-di-tert-butyl-benzofuran-2-one, 5,7-di-tert-butyl-3-[4-(2-stearoyloxyethoxy)phenyl] benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-di-methylphenyl)-5,7-di-tert-butyl-benzofuran-2-one.

The weight ratio of the stabilizer mixture to the conventional additives can be for example 1:0.5 to 1:5.

The examples below illustrate the invention in greater detail. All percentages or parts are by weight, unless stated otherwise.

Stabilizer Mixtures used in Examples 1 and 2
Stabilizer Mixture II-1
The compounds

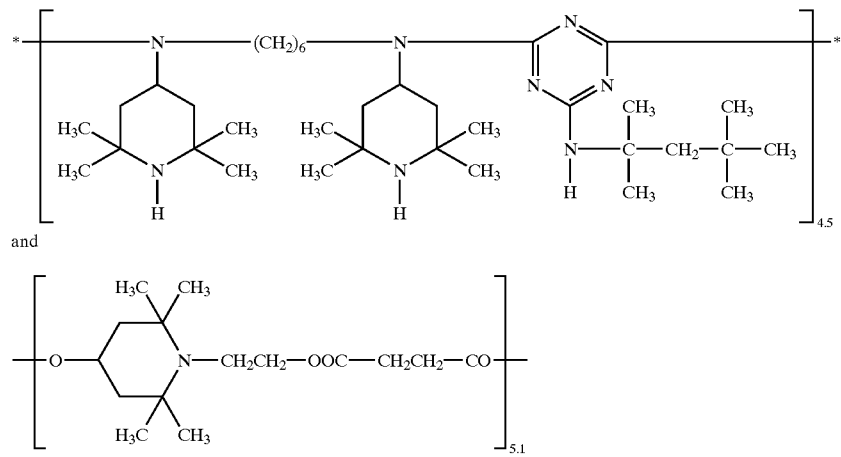

in a 1:1 weight ratio.
Stabilizer Mixture II-2
The compounds

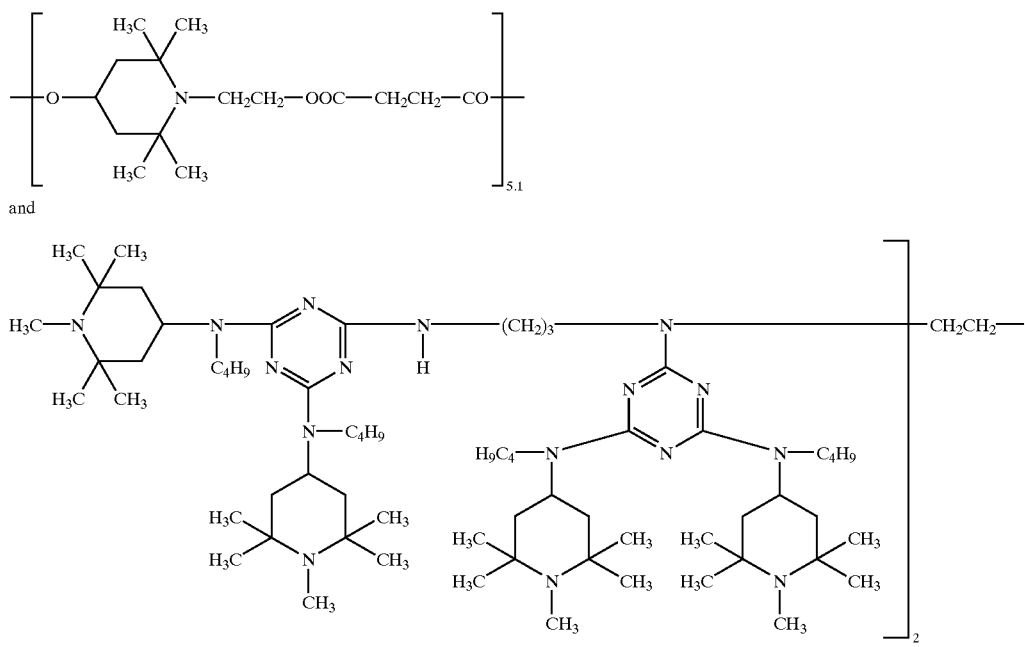

in a 1:1 weight ratio.

EXAMPLE 1

Light stabilization of metallocene polyethylene films.

100 parts of unstabilized metallocene polyethylene power (density: 0.903 g/cm$^3$, 10% butene comonomer, melt flow index ~5.0 g/10 minutes at 190° C. and 2160 g) are homogenized at 180° C. for 10 minutes in a Brabender plastograph with 0.02 parts of octadecyl 3-(3,5-di-tert-butyl-4-hydroxyphenyl)propionate, 0.08 parts of tris(2,4-di-tert-butylphenyl)phospite, 0.1 part of Ca stearate and the amount of the light stabilizer system indicated in Tables 1 and 2. The material thus obtained is compression molded in a laboratory press between two aluminum foils for 6 minutes at 170° C. to a 0.2 mm thick film which is quenched immediately in cold water. Samples of 60 mm×25 mm are cut out of these 0.2 mm films and are exposed in a ®WEATHER-OMETER Ci 65 (black panel temperature 63±2° C., without water-spraying). Periodically, these samples are removed from the exposure apparatus and their carbonyl content is measured with an infrared spectrophotometer.

The exposure time ($T_{0.1}$) corresponding to the formation of a carbonyl absorbance of 0.1 is a measure for the stabilizing efficiency of the light stabilizer system. The values obtained are summarized in the following Tables 1 and 2.

TABLE 1

| Light Stabilization | $T_{0.1}$ in hours |
|---|---|
| 0.15% of the stabilizer mixture II-1 | 11230 |
| 0.30% of the stabilizer mixture II-1 | 17365 |

TABLE 2

| Light Stabilization | $T_{0.1}$ in hours |
|---|---|
| 0.15% of the stabilizer mixture II-2 | 12000 |
| 0.30% of the stabilizer mixture II-2 | 17175 |

EXAMPLE 2

Light stabilization of metallocene polypropylene films. 100 parts of unstabilized metallocene polypropylene powder (melt flow index ~20 g/10 minutes at 230° C. and 2160 g) are homogenized at 200° C. for 10 minutes in a Brabender plastograph with 0.05 parts of pentaerythrityl-tetrakis{3-(3,5-di-tert-butyl-4-hydroxyphenyl)propionate}, 0.1 part of tris (2,4-di-tert-butylphenyl)phosphite, 0.1 part of Ca stearate and the amount of the light stabilizer system indicated in Table 3. The material thus obtained is compression molded in a laboratory press between two aluminum foils for 6 minutes at 260° C. to a 0.5 mm thick film which is cooled immediately to room temperature in a water-cooled press. Samples of 60 mm×25 mm are cut out of these 0.5 mm films and are exposed in a ®WEATHER-OMETER Ci 65 (black panel temperature 63±2° C., without water-spraying).

Periodically, these samples are removed from the exposure apparatus and their carbonyl content is measured with an infrared spectrophotometer.

The exposure time ($T_{0.2}$) corresponding to the formation of a carbonyl absorbance of 0.2 is a measure for the stabilizing efficiency of the light stabilizer system. The values obtained are summarized in the following Table 3.

TABLE 3

| Light Stabilization | $T_{0.2}$ in hours |
|---|---|
| 0.40% of the stabilizer mixture II-1 | 9280 |

We claim:

1. A composition containing

I) a polyolefin prepared by polymerization over a metallocene catalyst, and

II) a stabilizer mixture comprising two different components selected from the group of components a), b) and c);

component a) is at least one compound of the formula (I)

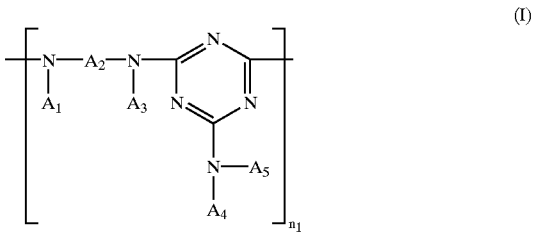

wherein $A_1$, $A_3$, $A_4$ and $A_5$ independently of one another are hydrogen, $C_1$–$C_{12}$alkyl, $C_5$–$C_{12}$cycloalkyl, $C_1$–$C_4$alkyl-substituted $C_5$–$C_{12}$cycloalkyl, phenyl, —OH— and/or $C_1$–$C_{10}$alkyl-substituted phenyl, $C_7$–$C_9$phenylalkyl, $C_7$–$C_9$phenylalkyl which is substituted on the phenyl radical by —OH and/or $C_1$–$C_{10}$alkyl; or a group of the formula (II),

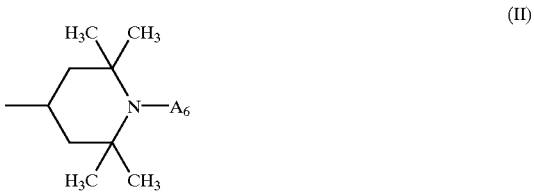

with $A_6$ being hydrogen, $C_1$–$C_8$alkyl, O$^-$, —OH, —CH$_2$CN, $C_1$–$C_{18}$alkoxy, $C_5$–$C_{12}$cycloalkoxy, $C_3$–$C_6$alkenyl, $C_7$–$C_9$phenylalkyl unsubstituted or substituted on the phenyl by 1, 2 or 3 $C_1$–$C_4$alkyl; or $C_1$–$C_8$acyl, $A_2$ is $C_2$–$C_{18}$alkylene, $C_5$–$C_7$cycloalkylene or $C_1$–$C_4$alkylenedi($C_5$–$C_7$cycloalkylene), or the radicals $A_1$, $A_2$ and $A_3$, together with the nitrogen atoms to which they are attached, form a 5- to 10-membered heterocyclic ring, or $A_4$ and $A_5$, together with the nitrogen atom to which they are attached, form a 5- to 10-membered heterocyclic ring, $n_1$ is a number from 2 to 50, and at least one of the radicals $A_1$, $A_3$, $A_4$ and $A_5$ is a group of the formula (II);

component b) is at least one compound of the formula (III)

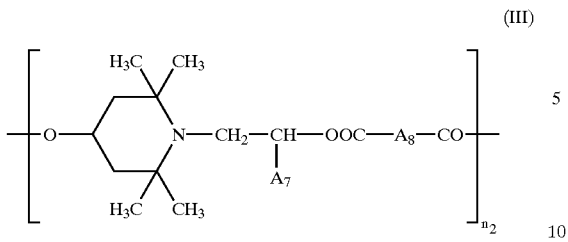

(III)

wherein $A_7$ is hydrogen or $C_1$–$C_4$alkyl, $A_8$ is a direct bond or $C_1$–$C_{10}$alkylene and $n_2$ is a number from 2 to 50; and component c) is at least one compound of the formula (IV)

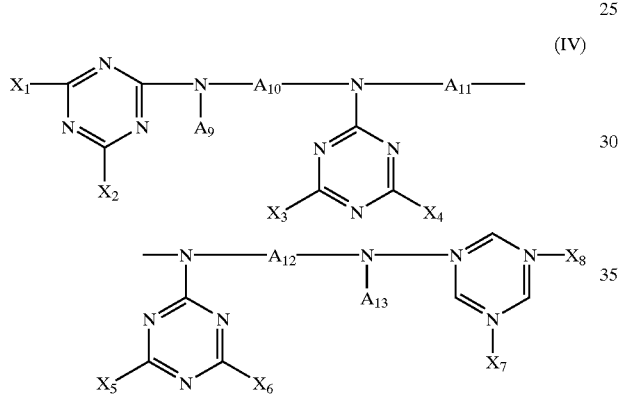

(IV)

wherein $A_9$ and $A_{13}$ independently of one another are hydrogen or $C_1$–$C_{12}$alkyl, $A_{10}$, $A_{11}$ and $A_{12}$ independently of one another are $C_2$–$C_{10}$alkylene, and $X_1$, $X_2$, $X_3$, $X_4$, $X_5$, $X_6$, $X_7$ and $X_8$ independently of one another are a group of the formula (V), (V)

in which $A_{14}$ is hydrogen, $C_1$–$C_{12}$alkyl, $C_5$–$C_{12}$cycloalkyl, $C_1$–$C_4$alkyl-substituted $C_5$–$C_{12}$cycloalkyl, phenyl, —OH— and/or $C_1$–$C_{10}$alkyl-substituted phenyl, $C_7$–$C_9$phenylalkyl, $C_7$–$C_9$phenylalkyl which is substituted on the phenyl radical by —OH and/or $C_1$–$C_{10}$alkyl; or a group of the formula (II) as defined above, and $A_{15}$ has one of the meanings of $A_6$;

with the proviso that the group —N($A_4$)($A_5$) does not contain a cycloalkyl group when the stabilizer mixture comprises the two components a) and b).

2. A composition according to claim 1 wherein $A_6$ and $A_{15}$ independently of one another are hydrogen or $C_1$–$C_4$alkyl.

3. A composition according to claim 1 wherein $A_1$, $A_3$, $A_4$ and $A_5$ independently of one another are hydrogen, $C_1$–$C_8$alkyl, $C_5$–$C_8$cycloalkyl, methyl-substituted $C_5$–$C_8$cycloalkyl, phenyl, $C_7$–$C_9$phenylalkyl or a group of the formula (II), or the radicals $A_4$ and $A_5$, together with the nitrogen atom to which they are attached, form a 6-membered heterocyclic ring, $A_2$ is $C_2$–$C_{10}$alkylene, and $n_1$ is a number from 2 to 25;

$A_7$ is hydrogen or methyl, $A_8$ is ethylene; and $n_2$ is a number from 2 to 25; and $A_9$ and $A_{13}$ independently of one another are hydrogen or $C_1$–$C_4$alkyl, $A_{10}$, $A_{11}$ is and $A_{12}$ independently of one another are $C_2$–$C_6$alkylene, and $A_{14}$ is hydrogen, $C_1$–$C_6$alkyl, $C_5$–$C_8$cycloalkyl, methyl-substituted $C_5$–$C_8$cycloalkyl, phenyl, $C_7$–$C_9$phenylalkyl or a group of the formula (II).

4. A composition according to claim 1 wherein component a) is at least one compound of the formula (I-1), (I-2), (I-3) or (I-4);

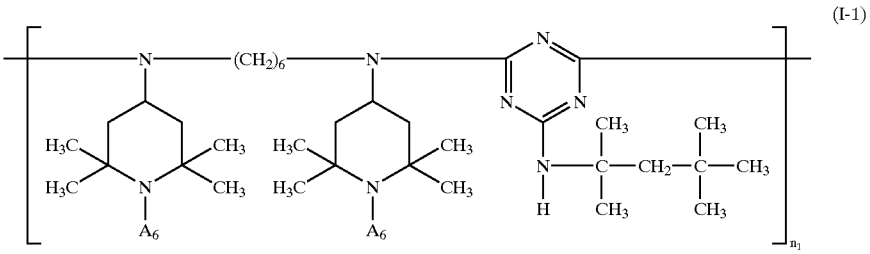

(I-1)

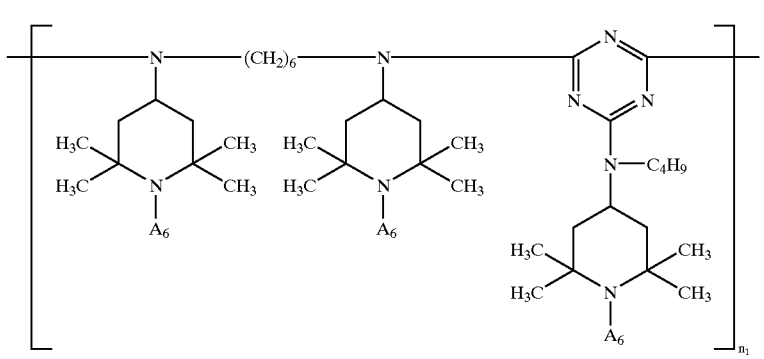
(I-2)
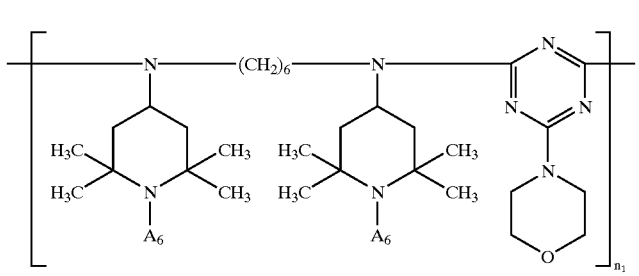
(I-3)
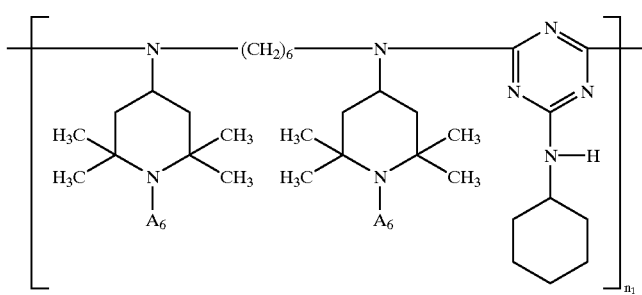
(I-4)
wherein $A_6$ is hydrogen or $C_1$–$C_4$alkyl and $n_1$ is a number from 2 to 25;
component b) is a compound of the formula (III-1)
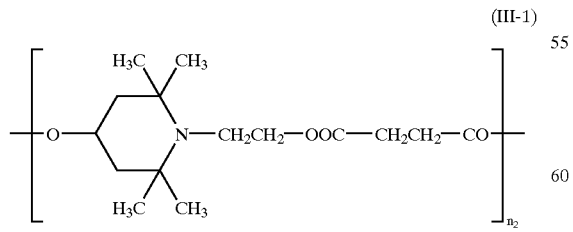
(III-1)
wherein $n_2$ is a number from 2 to 25; and
component c) is at least one compound of the formula (IV-1)

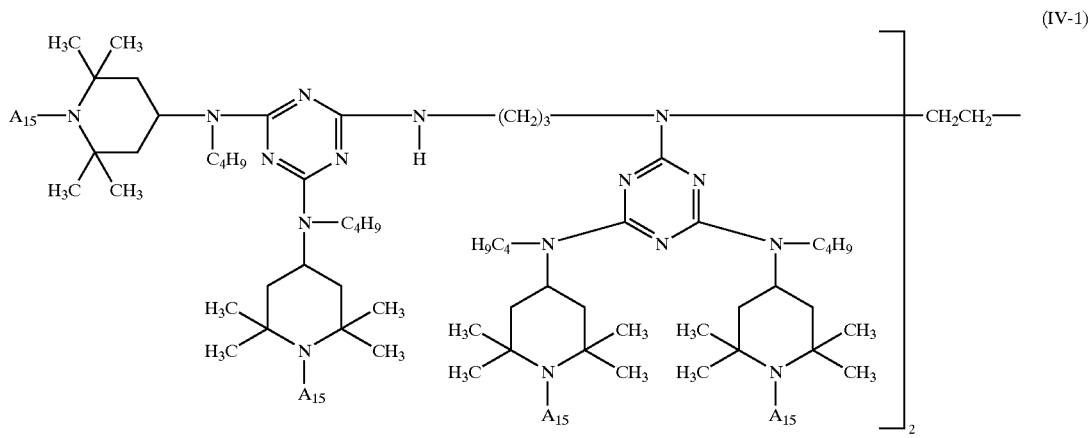

wherein $A_{15}$ is hydrogen or $C_1$–$C_4$alkyl.

5. A composition according to claim 1 wherein the two different components of the stabilizer mixture are the components a) and b).

6. A composition according to claim 1 wherein the two different components of the stabilizer mixture are the components a) and c).

7. A composition according to claim 1 wherein the two different components of the stabilizer mixture are the components b) and c).

8. A composition according to claim 1 wherein the stabilizer mixture comprises the compounds

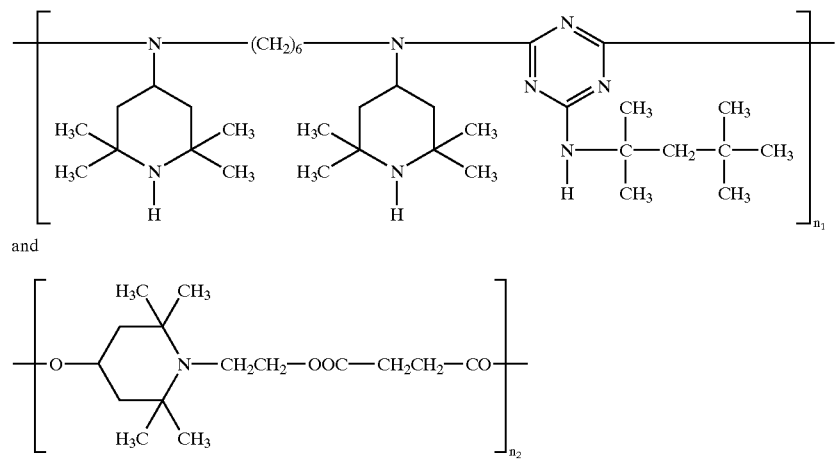

with $n_1$ and $n_2$ being a number from 2 to 25.

9. A composition according to claim 1 wherein the stabilizer mixture comprises the compounds

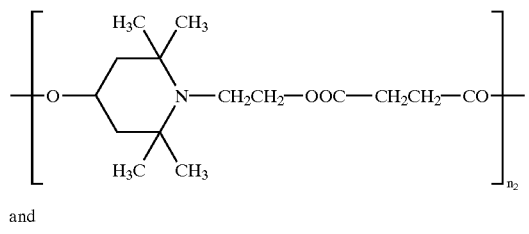

-continued

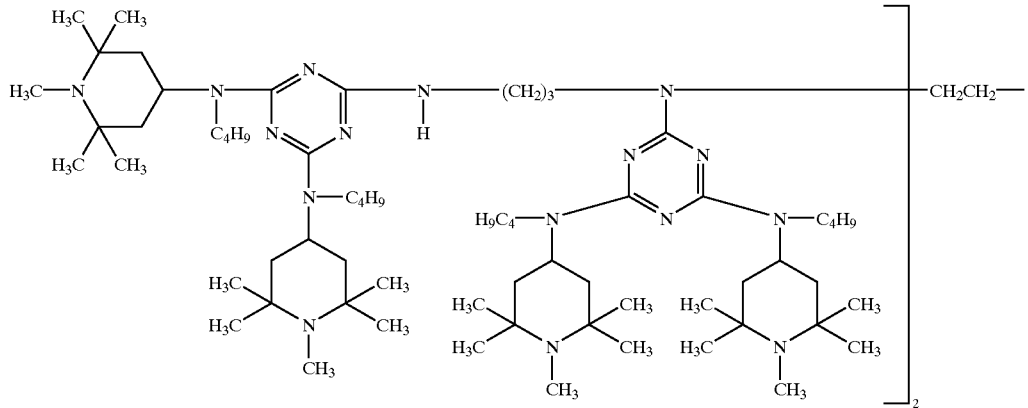

with $n_2$ being a number from 2 to 25.

10. A composition according to claim 1 wherein the polyolefin prepared by polymerization over a metallocene catalyst is polyethylene or polypropylene.

11. A composition according to claim 1 additionally comprising a polyolefin not prepared by polymerization over a metallocene catalyst.

12. A method for stabilizing a polyolefin prepared by polymerization over a metallocene catalyst, which comprises incorporating into said polyolefin a stabilizer mixture as defined in claim 1.

* * * * *